United States Patent [19]
Beyer

[11] 3,890,571
[45] June 17, 1975

[54] RADIO FREQUENCY POLARIMETER
[75] Inventor: John P. Beyer, Arlington, Va.
[73] Assignee: Communications Satellite Corporation, Washington, D.C.
[22] Filed: Oct. 17, 1973
[21] Appl. No.: 407,358

[52] U.S. Cl. .................... 324/95; 325/67; 343/703
[51] Int. Cl. ...................... G01r 21/12; G01r 29/00
[58] Field of Search ............... 324/95, 99 R; 325/67; 343/703

[56] References Cited
UNITED STATES PATENTS
| | | | |
|---|---|---|---|
| 2,991,417 | 4/1961 | Papp | 324/95 |
| 3,142,061 | 7/1964 | Allen | 343/703 |
| 3,408,568 | 10/1968 | Fisher | 324/99 R |

*Primary Examiner*—Alfred E. Smith
*Assistant Examiner*—Ernest F. Karlsen
*Attorney, Agent, or Firm*—Sughrue, Rothwell, Mion, Zinn and Macpeak

[57] ABSTRACT

A radio frequency polarimeter is disclosed for measuring the polarization characteristics of an RF signal existing in a round wave guide. The polarimeter includes an RF pick-up head, an RF switch, an RF to IF converter, and switched IF attenuators. One of the IF attenuators is fixed while the other is a precision variable attenuator. The output of the switched IF attenuators is synchronously detected. The polarimeter permits measurement with a high degree of precision and accuracy of both the axial ratio and the relative alignment of the polarization ellipse.

7 Claims, 1 Drawing Figure

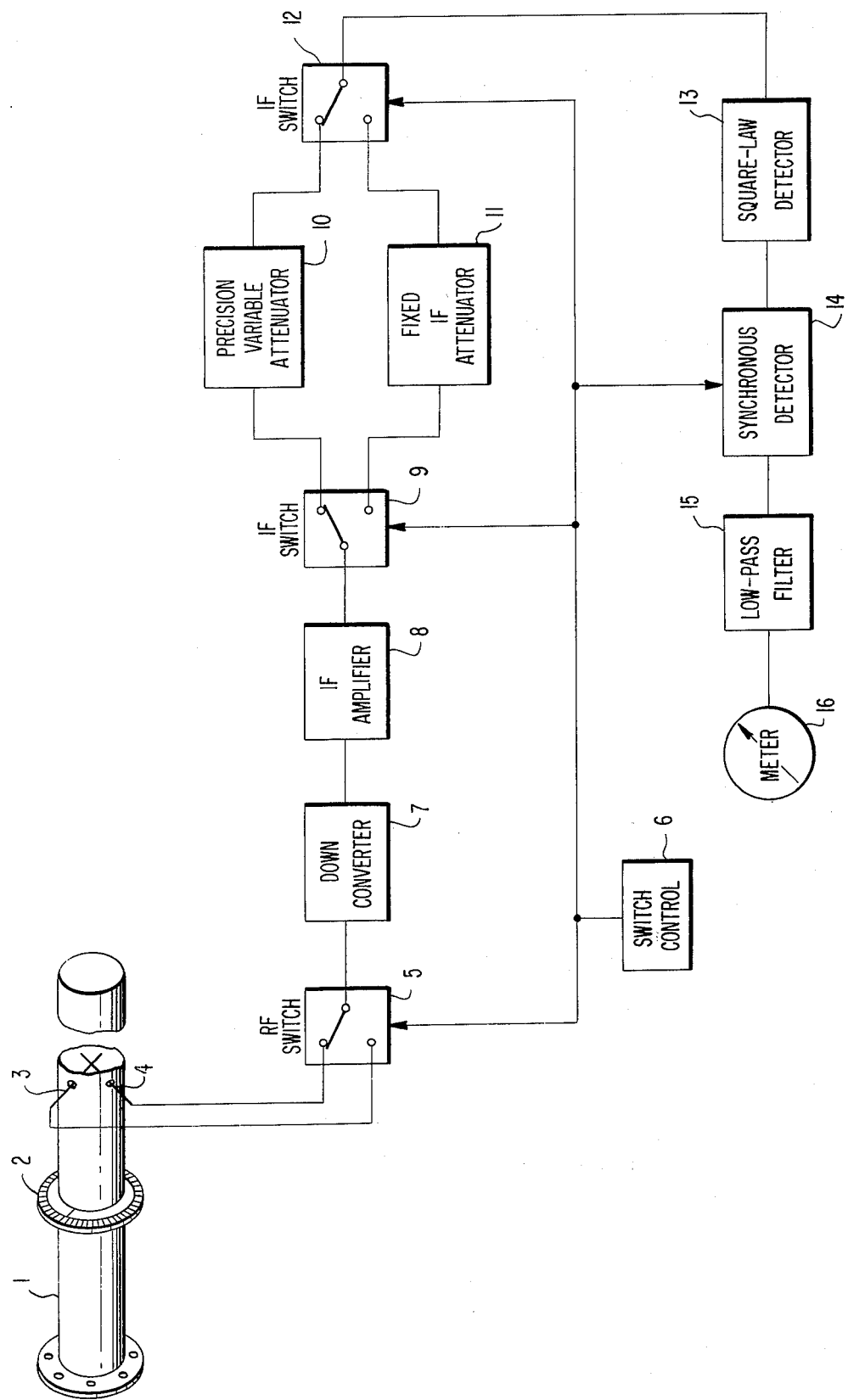

RADIO FREQUENCY POLARIMETER

BACKGROUND OF THE INVENTION

1. Field of the Invention

The present invention generally relates to measurement of electromagnetic wave energy, and more particularly to a radio frequency polarimeter which permits precise measurements for signals having very small axial ratios.

2. Description of the Prior Art:

The polarization state of a radio frequency signal is in general elliptical, characterized by (1) an axial ratio, (2) alignment of the principal or major axis of the ellipse to some arbitrary reference, and (3) its sense, either right-handed or left-handed. Where the polarization becomes nearly circular, it becomes increasingly difficult to measure the axial ratio or alignment angle, since to do so requires that very small changes in power be detected reliably. An ordinary method to make such a measurement would be to connect a linearly polarized pick-up probe to a power meter, rotate the probe, and observe the ratio of maximum to minimum power as the probe is rotated and its alignment when the power is either maximized or minimized. This method is suitable so long as the axial ratio is not too small, gain variations are small, the signal is large and constant, and the thermal noise is small. If one or several of these conditions is not met, fluctuations of the reading on the power meter can easily render the measurements meaningless.

SUMMARY OF THE INVENTION

It is, therefore, an object of the present invention to provide a radio frequency polarimeter which is insensitive to gain fluctuations and thermal noise, thereby permitting accurate and precise measurements of signals which have very small axial ratios.

It is another object of the invention to provide a method for making highly accurate and precision measurements of the purity of nominally circularly polarized signals.

The foregoing and other objects are attained by providing an instrument and a method which eliminate many of the problems of direct measurement by making a rapid, continuous comparison of the power on two orthogonal linearly polarized pickup probes as they are rotated. The instrument includes an RF pickup head, comprising a circular wave guide at its input end with a rotary slip joint and scale on which the rotation angle can be accurately measured. The circular wave guide is terminated by two orthogonal linear probes connected to a single-pole, double-throw RF switch. The output of the RF switch is connected to a down converter or mixer tuned to the signal frequency and providing an IF output. The IF output is amplified and applied to a pair of switched IF attenuators. One of the attenuators is fixed while the other is a precision variable attenuator. The output of the switched IF attenuators is synchronously detected.

To make a measurement, the pickup head is rotated until maximum unbalance is attained as indicated by the deflection of a meter connected to the output of the synchronous detector. The adjustable attenuator is adjusted to produce a zero, or null reading on the meter. Thereafter, the pickup head is rotated 90° for maximum deflection on the meter and, again, the variable attenuator is adjusted to provide a null. The axial ratio, in dB, is then one-half the difference, in dB, between the switched gain at the two positions.

To find the orientation of the elliptical axis, the switched gain of the variable attenuator is set midway between the two values just obtained, and the pickup head is again rotated to obtain balance as indicated by a null on the meter. The pickup probes are then 45° off the principle axis of the polarization ellipse. The polarimeter and the method described herein does not give any indication of the sense of polarization; however, the sense is generally known before hand, or it can be easily obtained by another measurement.

BRIEF DESCRIPTION OF THE DRAWING

The specific nature of the invention, as well as other objects, aspects, uses and advantages thereof, will clearly appear from the following description and from the accompanying drawing in which:

The sole FIGURE is a block diagram of the radio frequency polarimeter according to the invention.

DESCRIPTION OF THE PREFERRED EMBODIMENT

Referring now to the drawing, the RF pickup head for the polarimeter includes a circular wave guide 1 at its input end with a rotary slip joint 2 and scale on which the rotation angle can be accurately measured. The circular wave guide is terminated by two orthogonal linear probes 3 and 4. Instead of linear probes 3 and 4 illustrated in the FIGURE, two longitudinal slots located 90° from one another around the circumference of the wave guide with suitable coupling may be used. It is only necessary that a suitable means be provided measuring RF power at two positions separated by 90° about the circumference of the circular wave guide.

The outputs of the two linear probes 3 and 4 are connected to the fixed contacts of a single-Pole, double-throw RF switch 5. The RF switch 5 may be constructed by using high-isolation diode switches and isolators in a manner well known in the art. It is important, however, that the switch be designed to eliminate coupled reflections between channels. Switching is accomplished by biasing the diodes into conduction or nonconduction according to the output of the switch control 6. This output, which may in practice be two outputs 180° out of phase, is a square wave voltage at the desired switching frequency.

The output of the RF switch 5 is connected to a down converter or RF to IF mixer 7. Converter 7 is tuned to the signal frequency and feeds an IF signal to IF amplifier 8. The output of IF amplifier 8 is connected to a diode IF switch 9, again schematically illustrated as a single-pole, double-throw switch. Diode switch 9 is switched in synchronism with RF switch 5 under the control of the switch control 6. The "fixed" contacts of diode switch 9 are connected to a precision variable attenuator 10 and a fixed IF attenuator 11, respectively. The precision variable attenuator 10 is provided with a manually adjustable dial which is calibrated in decibels.

The outputs of the precision variable attenuator 10 and the fixed IF attenuator 11 are connected to the respective fixed contacts of a diode IF switch 12, which is identical in construction to diode switch 9. Diode switch 12 is switched in synchronism with diode switch 9 again under the control of switch control 6. The output of diode switch 12 is applied to a square law, or the like, detector 13. The output of detector 13 is a square wave having an amplitude proportional to the difference in power at the two orthogonal probes 3 and 4 as modified by the diode switched IF attenuators and a frequency equal to the switching frequency of a switch control 6. This output is applied to the input of a synchronous detector 14, which receives the switch control voltage as the synchronous input which provides an output DC voltage proportional to the amplitude of the square wave output of detector 13. The output of synchronous detector 14 is connected to an integrator or a low pass filter 15 which smooths the DC voltage, and this DC voltage is measured by a deflection of meter 16.

In order to make a measurement, the slip joint 2 is rotated to provide a maximum deflection of meter 16. Then the precision adjustable attenuator 10 is adjusted to provide a zero, or null, reading on meter 16. The angle indicated by the slip joint 2 and the decibel reading on the precision variable attenuator 10 are both noted. Alternatively, the slip joint and the adjustable attenuator may be simultaneously adjusted to maintain a null on the meter 16. In this case, adjustment is made to obtain the maximum decibel reading on attenuator 10. The two procedures are equivalent and yield the same results.

Once the first measurement has been made, the slip joint 2 is rotated approximately 90° for maximum deflection of meter 16, and a new switched gain setting is found by the adjustment of precision variable attenuator 10 to produce a null indication on meter 16. The axial ratio, in dB, is then one-half the difference, in dB, between the switch gain at the two positions.

It will be understood that in making the foregoing measurement, first one probe, and then the other, is approximately aligned with the major axis of the polarization ellipse. However, since the measurement of the alignment with respect to the polarization axis was essentially a peak reading or maximum measurement, the measurement is not precise. Therefore, in order to find the orientation of the ellipse axis, the switched gain is set on the precision variable attenuator 10 midway between the two values obtained above, and the pickup head is rotated to obtain a null indication on meter 16. At this position, the pickup probes 3 and 4 are then 45° off the principle axis of the polarization ellipse.

The essential feature of the invention is that it allows every measurement to be made as a null reading, i.e., a zero voltage on the output meter 16, which means, in turn, that the reading can be made with very high overall gain. The rapid switching of the circuit, together with the synchronous detection and integration, virtually eliminates fluctuation of overall system gain so long as the fluctuations are slow compared to the switching rate.

The need for a high-gain detector and the method of measurement according to the invention can be illustrated by considering the measurement of the ellipse polarization of the very small axial ratio, say on the order of 0.25 dB, to an accuracy of one degree or two degrees. The variation of the power ratio of the two pickup probes 3 and 4, for example, when they are aligned near 45 degrees from the principle ellipse axis is:

$$\frac{\delta R}{\delta \gamma} = -\frac{4(r-1)}{(r+1)}$$

—Continued $$\text{where } R = \frac{E_1^2}{E_2^2} \text{ at the two pickup probes,}$$

$\delta$ = orientation angle of the probes and
$r$ = the axial ratio being measured.

Thus, for an axial ratio of 0.25 dB ($r$=1.06), a change in gamma of one degree will cause only about 0.001 dB variation in the ratio of the signal at the two probes in the pickup. This small variation is easily within the range of the circuit according to the invention, but would be extremely difficult to detect any other way. This, of course, is an extreme example, but is serves to illustrate the usefulness of the highgain, null detection scheme according to the invention for making precise measurements of ratio frequency polarization.

The advantages of this system and method are that it is independent of fixed differential system gain in the two RF channels, of slow-gain or signal strength variations, and can be made with enough sensitivity to assure high precision. Accuracy of the measurement is determined primarily by the accuracy of the gain switched IF attenuators. The method lends itself to making measurements on a small signal in the presence of thermal noise by using narrow band width IF and taking advantage of the post-detection integration. While the instrument is intended for making measurements on signals which have very small axial ratios, i.e., those which are nearly circularly polarized, it is not necessarily limited thereto. It will, therefore, be apparent that the embodiment shown is only exemplary and that various modifications can be made in construction, arrangement and the practice within the scope of the invention is defined in the appended claims.

I claim:
1. A radio frequency polarimeter for measuring the axial ratio and orientation of the principle axis of elliptically polarized electromagnetic signals, comprising:
   a radio frequency pickup head having a rotatable member and means for measuring radio frequency power at two positions about said head angularly displaced by 90°;
   a radio frequency switch connected to receive as two inputs the radio frequency power measured at said two positions;
   converter means connected to the output of said radio frequency switch for converting radio frequency power to an intermediate frequency power;
   a first intermediate frequency switch connected to the output of said converter means and providing two outputs;
   a fixed intermediate frequency attenuator connected to one output and a variable attenuator connected to the other output of said first intermediate frequency switch;
   a second intermediate frequency switch having two inputs connected respectively to said fixed and variable attenuators;
   switch control means connected to said radio frequency switch and said first and second intermediate frequency switches for causing said switches to operate in synchronism, the frequency of said switch control means being greater than the fluctuations in the signal strength of said elliptically polarized electromagnetic signals; and
   synchronous detector means connected to the output of said second intermediate frequency switch and providing an output indication proportional to the difference in the power measured at said two positions as modified by the switched gains of said fixed and variable attenuators.

2. A polarimeter as recited in claim 1 wherein said synchronous detecting means includes:
   power detector means providing a square wave output having an amplitude proportional to the difference in the power measured at said two positions as modified by the switched gains of said fixed and variable attenuators and a frequency equal to the switching frequency of the said first and second intermediate frequency switches;
   a synchronous detector connected to said switch control means and receiving the output of said power detector means;
   integrating means connected to the output of said synchronous detector and providing an output DC voltage proportional to the amplitude of said square wave output of said power detector means; and
   indicating means connected to the output of said integrating means.

3. A polarimeter as recited in claim 2 wherein said power detector means is a square-law detector.

4. A polarimeter as recited in claim 2 wherein said integrating means is a low-pass filter.

5. A polarimeter as recited in claim 1 wherein said radio frequency pickup head includes:
   a circular wave guide input;
   a slip joint permitting the rotation of a terminating section of said circular wave guide; and
   first and second orthogonal linear probes in said terminating section.

6. A polarimeter as recited in claim 5 wherein said slip joint is provided with a calibrated vernier scale for indicating angular displacement and said synchronous switching means includes:
   a radio frequency switch connected to receive as two inputs the outputs of said first and second orthogonal linear probes;
   converter means connected to the output of said radio frequency switch for converting radio frequency power to an intermediate frequency power;
   a first intermediate frequency switch connected to the output of said converter means and providing two outputs;
   a fixed intermediate frequency attenuator connected to one output and a variable attenuator connected to the other output of said intermediate frequency switch, said variable attenuator being provided with a manually adjustable dial calibrated in decibels;
   a second intermediate frequency switch having two inputs connected respectively to said fixed and variable attenuator; and
   switch control means connected to said radio frequency switch and said first and second intermediate frequency switches for causing said switches to operate in synchronism.

7. A method of measuring the axial ratio and orientation of the principle axis of elliptically polarized electromagnetic signals comprising:
   measuring the maximum linear power difference between two orthogonal positions about the axis of propagation of said electromagnetic signal,
   synchronously switching the measuring power into two channels,
   synchronously detecting the output of the two channels and adjusting the relative gain of the two channels to reduce the detected power difference to a null,
   repeating the measurement of the maximum linear power difference between two orthogonal positions rotated 90° with respect to the first two positions,
   synchronously switching the second measured power into two channels,
   synchronously detecting the output of the two channels and adjusting the relative gain of the two channels to reduce the detected power difference to a second null,
   computing the axial ratio as one-half the difference in the relative gains obtained in the first and second adjustments of the relative gains of the two channels to produce the first and second nulls,
   adjusting the relative gain of the two channels midway between the relative gains which produce the first and second nulls, and
   measuring the minimum power difference between orthogonal positions rotated approximately 45° between the first and second two orthogonal positions to produce a third null as a measurement of the orientation of the elliptical axis.

* * * * *

UNITED STATES PATENT AND TRADEMARK OFFICE
CERTIFICATE OF CORRECTION

PATENT NO. : 3,890,571
DATED : June 17, 1975
INVENTOR(S) : JOHN P. BEYER

It is certified that error appears in the above-identified patent and that said Letters Patent are hereby corrected as shown below:

IN THE SPECIFICATION:

Column 2 - line 8, delete "principle" insert --principal-- lines 28-29, delete "orthoga-nal" insert --orthogonal-- line 37, delete "Pole" insert --pole-- line 64, insert the quotes around "fixed"

Column 3 - line 47, delete "principle" insert --principal-- line 64, delete "principle" insert --principal--

Column 4 - line 13, delete "highgain" insert --high-gain--

IN THE CLAIMS:

Column 4 - line 37, delete "principle" insert --principal--

Column 6 - line 14, delete "principle" insert --principal--

Signed and Sealed this third Day of February 1976

[SEAL]

Attest:

RUTH C. MASON
*Attesting Officer*

C. MARSHALL DANN
*Commissioner of Patents and Trademarks*